United States Patent

Tamura

[11] 4,309,973
[45] Jan. 12, 1982

[54] ELECTRONICALLY CONTROLLED IGNITION DEVICE FOR COMBUSTION ENGINE

[75] Inventor: Hideyuki Tamura, Yokohama, Japan

[73] Assignee: Nissan Motor Company, Ltd., Yokohama, Japan

[21] Appl. No.: 137,415

[22] Filed: Apr. 4, 1980

[30] Foreign Application Priority Data

Apr. 11, 1979 [JP] Japan .................................. 54-42948

[51] Int. Cl.³ .............................................. F02P 1/00
[52] U.S. Cl. ..................................... 123/609; 123/611
[58] Field of Search ......................... 123/609, 610, 611

[56] References Cited

U.S. PATENT DOCUMENTS

| | | | |
|---|---|---|---|
| 3,989,024 | 11/1976 | Lai | 123/609 |
| 4,095,576 | 6/1978 | Hahori | 123/609 |
| 4,162,666 | 7/1979 | Maioglio | 123/609 |
| 4,225,925 | 9/1980 | Hahori | 123/609 |

*Primary Examiner*—Ronald B. Cox
*Attorney, Agent, or Firm*—Schwartz, Jeffery, Schwaab, Mack, Blumenthal & Koch

[57] ABSTRACT

In an electronically controlled ignition device for a combustion engine, firstly an ignition timing and an energized angle of an ignition coil are calculated with response to running condition of the engine, secondly a non-energized angle of the ignition coil is calculated based on the result of the above calculation, thirdly the number of pulses generated with response to the angle of revolution of the engine is counted from the preceding ignition timing, so as to start the energizing of the ignition coil when the result of the above count coincides with the result of the above calculation of non-energized angle, and fourthly the number of pulses generated with response to the angle of revolution of the engine is counted from a reference position of revolution at which a reference pulse is generated by the revolution of the engine, so as to cut off the energizing of the ignition coil when the result of the above count of pulses coincides with the present ignition timing. Consequently, the ignition timing can be shifted with response to the running condition of the engine and the necessary energizing time duration for the ignition coil can be secured by correcting the energizing timing with response to the above shift of the ignition timing, so as to insure the energized time duration required for the ignition coil with a comparatively simple configuration.

9 Claims, 6 Drawing Figures

ововICALLY CONTROLLED IGNITION
ELECTRONICALLY CONTROLLED IGNITION DEVICE FOR COMBUSTION ENGINE

BACKGROUND OF THE INVENTION (1) Field of the Invention

The present invention relates to an electronically controlled ignition device provided for a combustion engine so as to control the ignition timing and the actuating time duration for the ignition coil thereof with response to the running condition thereof.

(2) Description of the Prior Art

The optimum ignition timing for the combustion engine is shifted with response to the revolution of the engine, the load imposed thereupon, the state of the cooling water and the inhaled air and so on, that is, the running conditions thereof. Among these conditions, the revolution thereof affects the ignition timing particularly, so that the more the revolution thereof is increased, the sooner the optimum ignition timing is advanced.

On the other hand, the high tension required for the ignition is generated on a secondary side of the ignition coil at an instant at which a primary current supplied thereto is cut off. In this case, a certain time duration elapsing after the ignition coil is energized is necessary for the amount of the primary current to reach a sufficient value enough to generate the high tension required for the ignition on the secondary side thereof because of the inductance thereof. Accordingly, it is necessary for effecting the ignition at the optimum ignition timing for the combustion engine to secure the aforesaid certain time duration required for the primary current to be grown up to the sufficient amount after the ignition coil has been energized prior to the optimum ignition timing. That is, although it is necessary as mentioned above that the ignition timing is shifted with response to the running conditions of the engine, the time duration for actuating the ignition coil should be maintained at a constant value.

Based on the mentioned above, in the conventional electronically controlled ignition device, an unactuated time duration required for maintaining the actuating time duration for the ignition coil at the constant value is calculated as well as the ignition timing is settled with response to the running condition of the combustion engine, so as to start the actuation of the ignition coil when the aforesaid unactuated time duration has expired after the application thereupon of the ignition signal.

However, such defects are apt to be caused according to the mentioned above that the misfire is brought about on a transient condition based on the too short actuating time duration, whilst an overload based on the too long actuating time duration is imposed on a driving transistor for the primary current to be supplied to the ignition coil.

The above mentioned defects will be explained hereinafter by referring to FIG. 1.

Figure 1:
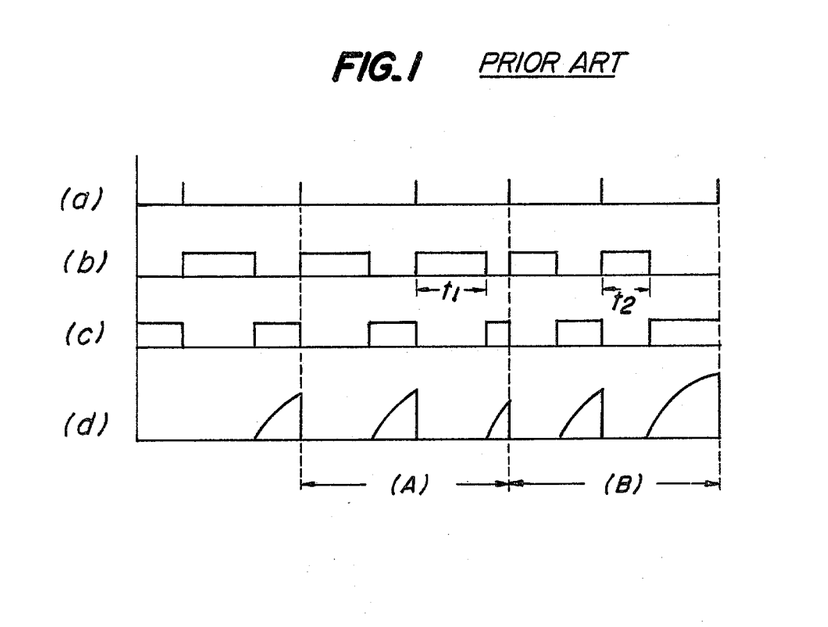

In FIG. 1, the ignition signal is indicated by (a), the unactuated time duration is indicated by (b), the actuating time duration is indicated by (c) and further the primary current supplied to the ignition coil is indicated by (d). For example, in the case that the speed of revolution of the engine is shifted from a low speed to a high speed, the higher the speed of revolution is raised, the sooner the ignition timing is advanced, so that the interval of the ignition signals is shortened on account of the advance of the ignition timing as shown in a section (A) of FIG. 1. However, regardless of the above shortened interval of the ignition signals, since the unactuated time duration is determined on the base of low speed of revolution of the engine prior to the above shift of speed, the actuation for the ignition coil is started at an instant at which the unactuated time duration $t_1$ on the low speed condition has expired after the preceding ignition timing, so that the actuating time duration is shortened. As a result thereof, as shown by (d) in FIG. 1, the actuation is cut off before the primary current reaches to the sufficient amount thereof.

On the contrary, in the case that the speed of revolution of the engine is shifted from a high speed to a low speed, the interval of the ignition signals is elongated as shown in a section (B) of FIG. 1. However, regardless of the above elongated interval of the ignition signals, the actuation for the ignition coil is started at an instant at which the unactuated time duration $t_2$ on the high speed condition has expired after the preceding ignition timing, so that the actuating time duration is elongated. As a result thereof, as shown by (d) in FIG. 1, the primary current supplied to the ignition coil reaches to an excessive amount.

According to the mentioned above, in the conventional electronically controlled ignition device, such a controlling method has been employed for the purpose of enabling the shift of the timing, at which the actuation of the ignition coil is started, with response to the shift of the actual ignition timing that the timings at which the actuation of the ignition coil is started and cut off are controlled with the time duration or the angle of the revolution of the engine, which is measured from a predetermined reference position of revolution.

However, according to the above mentioned method, when the speed of revolution of the engine reaches to the high speed range, it is feared that the timing at which the actuation of the ignition coil should precede the aforesaid reference position, in order to secure the constant actuating time duration for the ignition coil, so that it is required that different reference positions of revolution are settled respectively for the high and low speed ranges. As a result thereof, the defect of complicated configuration is caused.

SUMMARY OF THE INVENTION

An object of the present invention is to remove the above mentioned defects from an electronically controlled ignition device for a combustion engine.

Another object of the present invention is to provide an electronically controlled ignition device for a combustion engine, in which the required actuating time duration for the ignition coil can be secured with a comparatively simple configuration.

In an electronically controlled ignition device according to the present invention, firstly the ignition timing and an angle of revolution at which the ignition coil is actuated are calculated with response to the running condition of the engine, and secondly, another angle of revolution at which the ignition coil is unactuated is calculated on the base of the result of the above calculation, and thirdly the number of pulsive signals generated with response to the angle of revolution of the engine is counted from the preceding ignition timing, so as to start the actuation of the ignition coil at an instant at which the result of the above count of pulsive signals coincides with the result of the above calculation of the unactuated angle of revolution, and fourthly the number of pulsive signals generated with response to the angle of revolution of the engine is counted from the reference position of revolution at which a reference pulsive signal is generated by the revolution of the engine, so as to cut off the actuation of the ignition coil at an instant at which the result of the above count of pulsive signals coincides with the succeeding ignition timing. As a result thereof, the ignition timing can be shifted with response to the running condition of the engine and the necessary actuating time duration for the ignition coil can be secured by correcting the timing, at which the actuation of the ignition coil is started, with response to the above shift of the ignition timing.

The present invention will be further explained in detailed hereinafter by referring to the following drawings.

BRIEF DESCRIPTION OF THE DRAWINGS

FIG. 1(a), (b), (c) and (d) are diagrams showing the behaviour of an electronically controlled conventional ignition device for a combustion engine as mentioned above;

DESCRIPTION OF THE PREFERRED EMBODIMENTS

Figure 2:
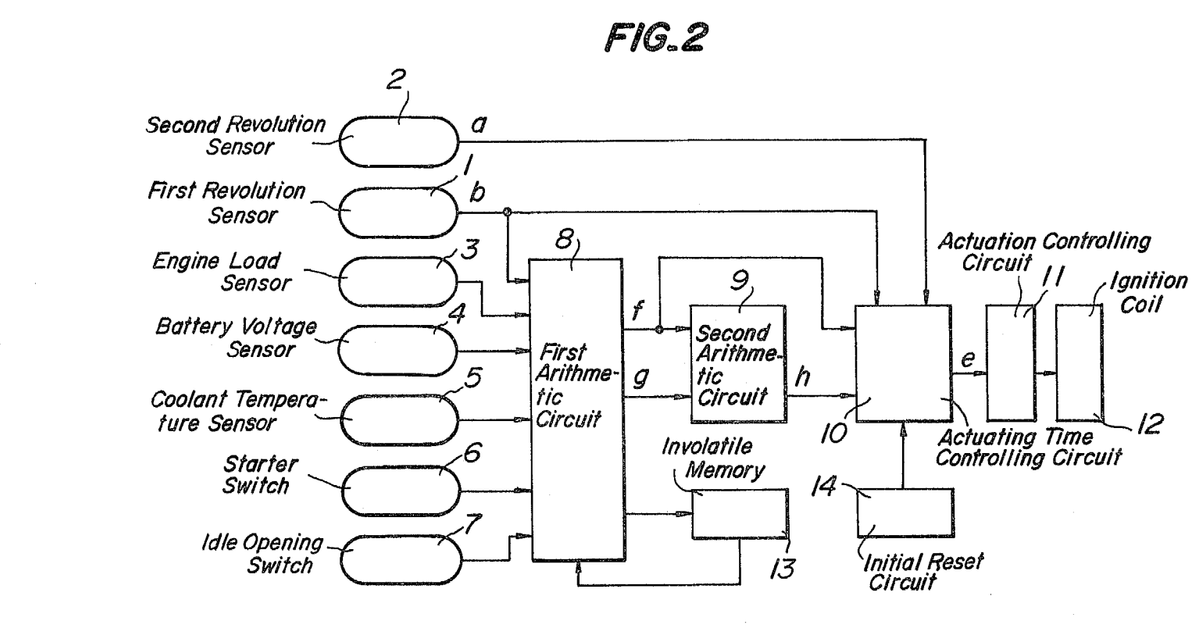
FIG. 2 is a block diagram showing a preferred embodiment of the present invention.

Firstly, a preferred example of a circuit configuration of the electronically controlled ignition device for the combustion engine according to the present invention is shown in FIG. 2. In FIG. 2, 1 denotes a first revolution sensor for generating pulsive signals the number of which is in proportion to the angle of revolution of the engine, namely, angular pulsive signals; 2 denotes a second revolution sensor for generating reference pulsive signals the number of which corresponds to the number of cylinders of the combustion engine during one revolution thereof; 3 denotes an engine load sensor for detecting an amount indicating a load imposed upon the engine; 4 denotes a battery voltage sensor; 5 denotes a coolant temperature sensor; 6 denotes a starter switch; 7 denotes an idle opening switch for a throttle; 8 denotes a first arithmetic circuit for calculating an ignition timing and an angle of revolution at which the ignition coil is actuated, on the strength of output signals derived respectively from the above mentioned kinds of sensors 1, 3, 5 and switches 6, 7; 9 denotes a second arithmetic circuit for calculating another angle of revolution at which the ignition coil is unactuated on the strength of the ignition timing and the above actuating angle for the ignition coil which are calculated by the first arithmetic circuit 8; 10 denotes an actuating time controlling circuit for generating a controlling signal provided for controlling a time duration of actuation for the ignition coil on the strength of output signals derived respectively from the first and second revolution sensors 1, 2 and the first and second arithmetic circuits 8, 9; 11 denotes an actuation controlling circuit for actuating the ignition coil 12 when the output signal derived from the actuating time controlling circuit 10 indicates a high level and for cutting off the above actuation for the ignition coil 12 when the above output signal indicates a low level; 13 denotes an involatile memory for memorizing a functional value of a battery voltage which value is used for correcting the above mentioned actuating angle of revolution for the ignition coil with response to the battery voltage, that is, a correcting coefficient thereof; and 14 denotes an initial reset circuit for generating a reset signal when a source voltage is supplied initially to the present ignition device.

Nextly, the operations of the above mentioned various elements will be explained respectively by referring to FIGS. 3 to 6 hereinafter.

At first, in the first arithmetic circuit 8, an optimum ignition timing "f" corresponding to the running condition of the engine is calculated in a form of a value which corresponds to the counted number of the angular pulsive signal "b" derived from the first revolution sensor 1 as shown in FIG. 6(b) and the various kinds of output signals derived respectively from the engine load sensor 3, the coolant temperature sensor 5, the starter switch 6 and the idle opening switch 7 for the throttle. Together therewith, the actuating angle "g" of revolution for the ignition coil is calculated on the strength of the above angular pulsive signal "b" and the memory contents readout from the involatile memory 13 with response to the output signal derived from the battery voltage sensor 4, according to the following equation.

$$g = N + C(V_B) \qquad (1)$$

where N denotes a number of revolution (rpm) of the engine, which corresponds to the number of angular pulsive signals derived from the first revolution sensor 1 during a certain predetermined time duration, for example, during 10 m.sec, and $C(V_B)$ denotes a function (a correcting coefficient) of the battery voltage, which can be calculated according to the following equation, when a primary resistance of the ignition coil is denoted by R, an inductance thereof is denoted by L, a primary cutoff current thereof is denoted by I, the reference voltage is denoted by $V_{BO}$, the battery voltage is denoted by $V_B$, and the actuating time duration for the ignition coil is denoted by $T_{on}$.

$$C(V_B) = \frac{T_{on}(V_B)}{T_{on}(V_{BO})} = \frac{\log_e\left(1 - \frac{RI}{V_B}\right)}{\log_e\left(1 - \frac{RI}{V_{BO}}\right)} \qquad (2)$$

Figure 3:
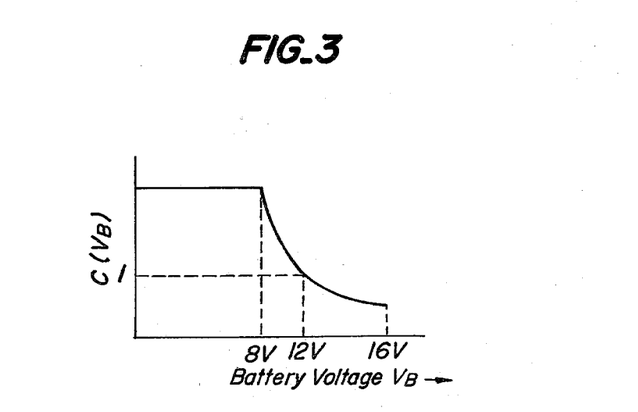
FIGS. 3, 4 and 5 are diagrams showing the behaviour of an electronically controlled ignition device for a combustion engine according to the present invention respectively.

A typical example of the function $C(V_B)$ of the battery voltage according to the above equation (2) in case the reference voltage $V_{BO}$ is settled to 12 V is shown in FIG. 3. In this example, the battery voltage $V_B$ and the function $C(V_B)$ of the battery voltage corresponding thereto have been memorized previously in the involatile memory 13 in a form of map.

Accordingly, in the first arithmetic circuit 8, the angular pulsive signals derived from the first revolution sensor 1 are counted during the above predetermined time duration, as well as the amount of the battery voltage detected by the battery voltage sensor 4 is performed with an analog to digital conversion, and a value of the function $C(V_B)$ of the battery voltage, which corresponds to a digital value obtained by the above conversion, is readout from the involatile memory 13, so as to be applied to the first arithmetic circuit 8 for calculating the actuating angle "g" of revolution of the ignition coil according to the above equation (1). However, in case either the value resulted thereby exceeds an upper limit thereof or is restrained below a lower limit thereof, those upper and lower limits can be regarded as the required actuating angle g of revolution of the ignition coil.

Figure 4:
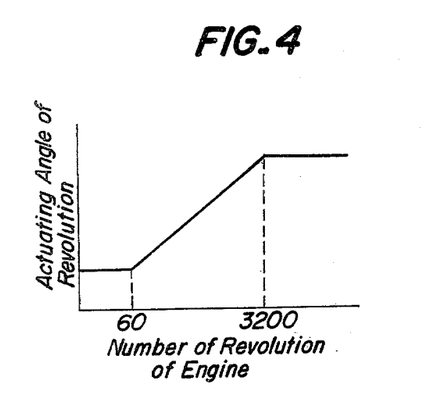

The relation between the actuating angle "g" of revolution of the ignition coil which is calculated as mentioned above and the number N of revolution of the engine can be obtained as shown in FIG. 4.

Figure 5:
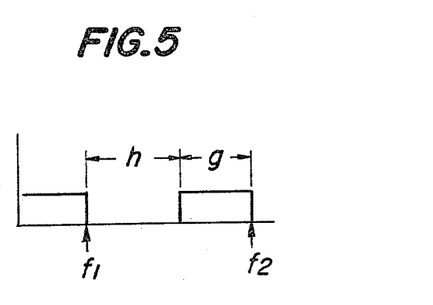

Nextly, in the second arithmetic circuit 9, the unactuated angle "h" of revolution for the ignition coil is calculated according to the following equation on the strength of the ignition timing "f" and the actuating angle "g" of revolution which have been calculated in the first arithmetic circuit 8 as mentioned above.

$$h = (f_2 - f_1) - g \qquad (3)$$

where $f_2$ denotes the present ignition timing calculated in the first arithmetic circuit 8, $f_1$ denotes the preceding ignition timing calculated previously in the first arithmetic circuit 8 at which the ignition has been effected actually and "g" denotes the actuating angle of revolution for the ignition coil which is calculated in the first arithmetic circuit 8 also. The relation between those various kinds of amounts is shown in FIG. 5.

By the way, in case that a microcomputer is employed as the first and second arithmetic circuits 8 and 9, a high reliability can be realized for the above calculations.

Figure 6:
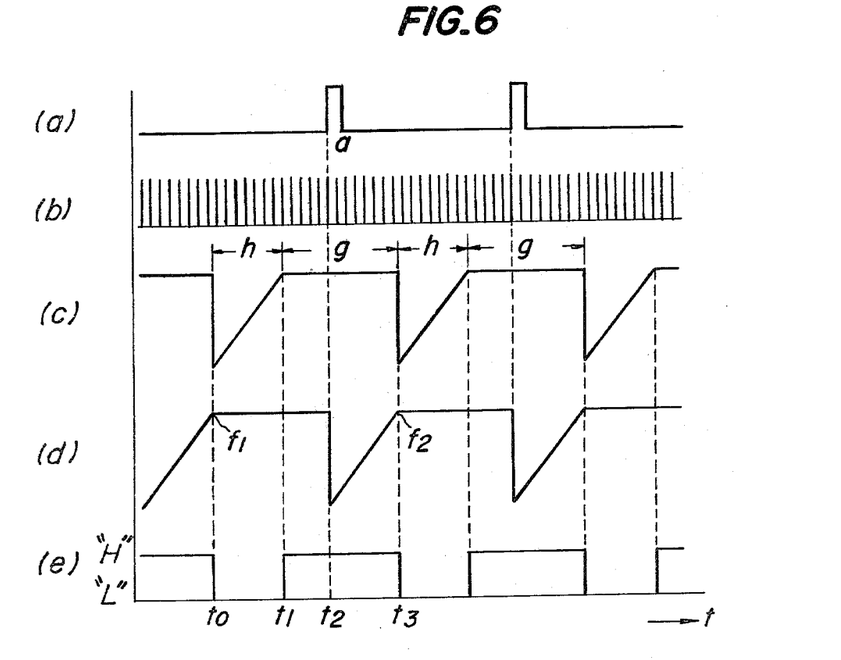
FIG. 6 is a time chart showing the behaviour of the electronically controlled ignition device according to the present invention.

Nextly, the operations of the actuating time controlling circuit 10 and the actuation controlling circuit 11 will be explained hereinafter by referring to FIG. 6.

In the actuating time controlling circuit 10, the angular pulsive signals "b" derived from the first revolution sensor 1 which are shown in FIG. 6(b) are counted by a counter provided for obtaining the unactuated angle of revolution for the ignition coil, the count thereof being started at the preceding ignition timing $f_1$ at which the ignition has been effected actually, that is, at a timing $t_0$ shown in FIG. 6(e).

The above count is stopped at a timing $t_1$ at which a value resulted by the above count coincides with the unactuated angle "h" of revolution for the ignition coil as shown in FIG. 6(c), so as to raise an output signal "e" derived from the actuating time controlling circuit 10 upon a high level thereof as shown in FIG. 6(e). As a result thereof, the actuation controlling circuit 11 starts the actuation for the ignition coil 12.

In the above mentioned state, when the reference pulsive signal "a" derived from the second revolution sensor 2 as shown in FIG. 6(a) is applied to the actuating time controlling circuit 10 at a timing $t_2$ shown in FIG. 6(e), the count of the angular pulsive signals "b" is started by another counter provided for obtaining the ignition timing at the aforesaid timing $t_2$, and then is stopped at a succeeding timing $t_3$ at which a value resulted by the above count coincides with the present ignition timing $f_2$ which has been calculated in the first arithmetic circuit 8 as shown in FIG. 6(d), so as to lower the output signal "e" derived from the actuating time controlling circuit 10 upon a low level thereof as shown in FIG. 6(e). As a result thereof, the actuation controlling circuit 11 cutoff the actuation for the ignition coil 12, so as to generate a high tension effecting the ignition at the secondary side of the ignition coil 12.

Nextly, the behaviour at the starting of the combustion engine will be explained hereinafter.

When the source voltage is supplied to the ignition device according to the present invention, the reset signal is generated in the initial reset circuit 14, so as to lower the output signal derived from the actuating time controlling circuit 10 upon the low level. Accordingly, immediately after the source voltage has been supplied to the ignition device, the ignition coil is not yet actuated. Thereafter, when the respective generations of the angular pulsive signals "b" and the reference pulsive signals "a" in the first and second revolution sensors are started with response to the starting of the revolution of the engine which is caused by a starter, as well as the operation of the actuating time controlling circuit 10 is started at the same time, so as to perform the actuation for the ignition coil 12. By the way, both of those pulsive signals "a" and "b" are unstable at the starting of the revolution, so that it is preferable that the operation of the actuating time controlling circuit 10 is started after a certain predetermined number of those pulsive signals have been generated.

Moreover, in the actuating time controlling circuit 10, if either one of those reference and angular pulsive signals "a" and "b" is not yet applied thereto for a certain predetermined time duration on the condition of the high level of the output signal "e" thereof, the output signal "e" is lowered forcibly upon the low level thereof, so as to inhibit the actuation for the ignition coil 12.

Furthermore, both of respective timings at which the ignition timing "f" and the unactuated angle "h" of revolution for the ignition coil are applied to the actuating time controlling circuit 10 from the first and second arithmetic circuits 8 and 9 respectively are synchronized with the reference pulsive signal "a". However, the unactuated angle "h" of revolution for the ignition coil is applied to the actuating time controlling circuit 10 every time the calculation thereof carried out in the second arithmetic circuit 9 is finished in the state of low speed of revolution of the engine.

As explained above, in the electronically controlled ignition device for the combustion engine according to the present invention, firstly, the ignition timing and the actuating angle of revolution for the ignition coil which correspond to the running condition of the engine are calculated, and secondly, based thereupon, the unactuated angle of revolution for the ignition coil is calculated as well as the deviation thereof caused by the shift of the ignition timing is corrected, and thirdly, the angular pulsive signals generated with response to the angle of revolution of the engine are counted by referring to the immediately preceding ignition timing, so as to start the actuation for the ignition coil at the timing at which the value resulted by the above count of the angular pulsive signals coincides with the above unactuated angle of revolution for the ignition coil, so that it is possible to secure the time duration required for the actuation of the ignition coil, which corresponds to the product of the actuating angle of revolution multiplied by the period of the angular pulsive signal, with the employed simple configuration of the ignition device. Accordingly, the occurrence of the misfire in the transient state and the overload imposed upon the transistors used in the circuitry can be prevented effectively. Moreover, since the actuation of the ignition coil can be controlled by referring to the immediately preceding actual ignition timing, it is not feared at all that the starting of the actuation for the ignition coil precedes the reference position of the ignition.

Particularly, in case that the angular pulsive signals are counted for a certain predetermined time duration in the second arithmetic circuit, the value resulted thereby being multiplied by a certain constant value, for instance, a correcting coefficient corresponding to the battery voltage, so as to be adopted as the actuating angle of revolution for the ignition coil, even if the interval of the angular pulsive signals is varied with response to the variation of the number of revolution of the engine, the actuating angle of revolution for the ignition coil can be varied according thereto, so that the time duration of the actuation for the ignition coil can be maintained at a constant value, so as to stabilize the performance of the ignition.

Furthermore, in case that the actuating angle of revolution for the ignition coil can be corrected with response to the variation of the battery voltage, the primary cutoff current for the ignition coil can be maintained at a constant value regardless of the variation of the battery voltage, so that the sufficient amount of the primary cutoff current for the ignition coil can be insured by elongating the time duration for the actuation of the ignition coil on the condition of the low battery voltage, so as to improve the performance of the ignition. On the other hand, the flow of excessive current through the igniting transistor on the condition of the high battery voltage can be prevented by shortening the time duration of the actuation for the ignition coil, so as to improve the reliability of the igniting transistor. Moreover, in this case, it can be prevented also by memorizing the above required correcting coefficient in the involatile memory previously that the corrected actuating angle of revolution for the ignition coil is further varied by any delicate variation of the condition of the circuitry.

Moreover, in case that the upper and lower limits of the actuating angle of revolution for the ignition coil are settled previously, such a deficiency can be removed that the actuating angle of revolution becomes too large with a result of a negative unactuated angle caused thereby on the condition of high speed running of the engine, or, on the contrary, the actuating angle of revolution becomes too small on the condition of the low speed running of the engine.

In contrast therewith, in case that the timings at which the ignition timing and the unactuated angle of revolution for the ignition coil are applied to the actuating time controlling circuit from the first and second arithmetic circuits respectively is not controlled at all, it is feared that another deficiency of too short time duration of the actuation for the ignition coil is caused. However, the occurrence of such a deficiency can be prevented by controlling those timings of the application according to the reference pulsive signals derived from the second revolution sensor.

Regardless thereof, it is preferable on the condition of the low speed running of the engine that, every time the calculation of the unactuated angle of revolution for the ignition coil is finished, the result thereof is applied to the actuating time controlling circuit.

On he other hand, the flow of excessive current through ignition controlling transistors can be prevented at the occurrence of engine failure by inhibiting the actuation of the ignition coil when either the angular pulsive signal or the reference pulsive signal is not yet applied to the actuating time controlling circuit for a certain predetermined time duration.

Similarly, it is preferable for protecting the ignition controlling transistors that the actuation of the ignition coil is inhibited until the engine is started after the source voltage is supplied thereto.

What is claimed is:

1. An electronically controlled ignition device for a combustion engine, comprising
    a first revolution sensor for generating an angular pulsive signal with response to an angle of revolution of the combustion engine,
    a second revolution sensor for generating a number of reference pulsive signals during every one revolution of the combustion engine which number corresponds to a number of cylinders of the combustion engine,
    a first arithmetic circuit for calculating an ignition timing and an actuating angle of revolution for an ignition coil with response to a running condition of the combustion engine,
    a second arithmetic circuit for calculating an unactuated angle of revolution for the ignition coil by referring to said ignition timing and said actuating angle of revolution for the ignition coil calculated in said first arithmetic circuit,
    an actuating time controlling circuit for counting firstly said angular pulsive signals generated after the immediately preceding ignition timing, and starting the actuation for the ignition coil at a timing at which a value resulted by the first count of said angular pulsive signals concides with said unactuated angle of revolution calculated in said second arithmetic circuit, and counting secondly said angular pulsive signals generated after said reference pulsive signal is applied to said actuating time controlling circuit, and further generating an output signal for cutting off the actuation for the ignition coil at a timing at which a value resulted by the second count of said angular pulsive signals coincides with said ignition timing calculated in said first arithmetic circuit, and
    an actuation controlling circuit for controlling the actuation for the ignition coil according to said output signal generated in said actuating time controlling circuit.

2. An electronically controlled ignition device for a combustion engine as claimed in claim 1, wherein said angular pulsive signals are counted during a predetermined time duration, and a product of a value resulted by the count of said angular pulsive signals which is multiplied by a constant number is calculated as said actuating angle of revolution for the ignition coil.

3. An electronically controlled ignition device for a combustion engine as claimed in claim 1 or 2, wherein said first arithmetic circuit is provided with a faculty of correcting said actuating angle of revolution for the ignition coil with response to a battery voltage.

4. An electronically controlled ignition device for a combustion engine as claimed in claim 3, wherein a correcting coefficient provided for correcting said actuating angle of revolution with response to the battery voltage is memorized in an involatile memory.

5. An electronically controlled ignition device for a combustion engine as claimed in claim 1, wherein said first arithmetic circuit is provided with a faculty of disposing of a predetermined upper limit or a predetermined lower limit of said actuating angle of revolution for the ignition coil as said actuating angle of revolution proper when said actuating angle of revolution calculated in said first arithmetic circuit exceeds said upper limit or is restrained below said lower limit respectively.

6. An electronically controlled ignition device for a combustion engine as claimed in claim 1, wherein said ignition timing and said unactuated angle of revolution for the ignition coil calculated in said first and second arithmetic circuits respectively are applied to said actuating time controlling circuit respectively at timings which are synchornized with said reference pulsive signals generated in said second revolution sensor.

7. An electronically controlled ignition device for a combustion engine as claimed in claim 6, wherein said unactuated angle of revolution for the ignition coil is applied to said actuating time controlling circuit every time the calculation of said unactuated angle of revolution in said second arithmetic circuit is finished on a condition of low speed revolution of the combustion engine.

8. An electronically controlled ignition device for a combustion engine as claimed in claim 1, wherein said actuating time controlling circuit is provided with a faculty of inhibiting the actuation for the ignition coil when either said angular pulsive signal generated in said first revolution sensor or said reference pulsive signal generated in said second revolution sensor is not applied to said actuating time controlling circuit during a predetermined time duration.

9. An electronically controlled ignition device for a combustion engine as claimed in claim 1, wherein said actuating time controlling circuit inhibits the actuation for the ignition coil by being reset immediately after a source voltage is supplied to said electronically controlled ignition device and starts the operation for the actuation of the ignition coil after at least respective one of a predetermined plurality of said angular pulsive signals and said reference pulsive signals generated in said first and second revolution sensors respectively is applied to said actuating time controlling circuit.

* * * * *

UNITED STATES PATENT AND TRADEMARK OFFICE
CERTIFICATE OF CORRECTION

PATENT NO. : 4,309,973
DATED      : January 12, 1982
INVENTOR(S): Hideyuki TAMURA It is certified that error appears in the above—identified patent and that said Letters Patent is hereby corrected as shown below:

IN THE ABSTRACT:

Column 2, line 21, delete "secured" and insert therefor --obtained--.

Column 1, line 14, after "revolution" insert --rate--;

line 18, after "revolution" insert --rate--; delete "parti-";

line 19, delete "ularly" and insert therefor --greatest--; after "revolution" insert --rate--;

line 20, delete "sooner" and insert therefor --more--;

line 28, delete "enough";

line 30, delete "it is";

line 31, delete "necessary for effecting the" and insert therefor --in order to effect--;

line 32, delete "to secure";

line 33, after "duration" insert --is--;

line 34, delete "be grown up" and insert therefor --increase--;

UNITED STATES PATENT AND TRADEMARK OFFICE
CERTIFICATE OF CORRECTION

PATENT NO. : 4,309,973
DATED : January 12, 1982
INVENTOR(S) : Hideyuki TAMURA

It is certified that error appears in the above—identified patent and that said Letters Patent is hereby corrected as shown below:

Column 1, line 37, delete "shifted with" and insert therefor --changed in--;

line 41, delete "mentioned";

line 45, delete "as well as" and insert therefor --and--; delete "settled with" and insert therefor --set in--;

line 49, delete "thereupon";

line 51, delete "such" and insert therefor --in the above device,--; delete "according" and insert therefor --such as--;

line 52, delete "to the mentioned above that the"; after "misfire" delete "is";

line 53, delete "the" and insert therefor --a--;

line 54, delete "whilst" and insert therefor --or--; delete "the" and insert therefor --a--;

line 55, delete "is";

line 56, after "current" delete "to be";

line 67, delete "sooner" and insert therefor --more--;

line 68, delete "of the" (first occurrence) and insert therefor --between--;

UNITED STATES PATENT AND TRADEMARK OFFICE
CERTIFICATE OF CORRECTION

PATENT NO. : 4,309,973         Page 3 of 9
DATED      : January 12, 1982
INVENTOR(S): Hideyuki TAMURA It is certified that error appears in the above—identified patent and that said Letters Patent is hereby corrected as shown below:

Column 2, line 2, delete "regardless of the above shortened";

line 3, delete "interval of the ignition signals,";

line 4, delete "base" and insert therefor --basis--; insert --a-- between "of" and "low";

line 11, delete "to";

line 12, delete "thereof";

line 13, delete "On the contrary,"; delete "in" and insert therefor --In-- line 15, delete "of the" and insert therefor --between--;

line 21, delete "elongated" and insert therefor --lengthened-- line 23, after "reaches" delete "to";

line 25, delete "According to the mentioned above,", delete "in" and insert therefor --In--;

line 26, delete "such a" and insert therefor --the--;

line 27, delete "has been"; after "employed" delete "for the purpose" and insert therefor --enables--.

UNITED STATES PATENT AND TRADEMARK OFFICE
CERTIFICATE OF CORRECTION

PATENT NO. : 4,309,973
DATED : January 12, 1982
INVENTOR(S) : Hideyuki TAMURA

It is certified that error appears in the above—identified patent and that said Letters Patent is hereby corrected as shown below:

Column 2, line 28, delete "of enabling the" and insert therefor --a--; delete the comma (,) after "timing"; after "which" delete "the";

line 29, delete the comma (,) after "started";

line 30, insert a period --.-- after "timing"; delete "that the" and insert therefor --The--;

line 32, delete "with" and insert therefor --by--;

line 36, delete "to" and insert therefor --a--;

line 37, delete "the" (first occurrence); delete "feared" and insert therefor --necessary--;

line 38, after "coil" insert --starts--;

line 39, delete the comma (,) after "position" and insert therefor a period --.--; change "in" to --In--; delete "secure the" and insert therefor --obtain a--;

line 40, delete "so"

line 41, delete "that" (first occurrence);

line 42, delete "settled" and insert therefor --set,--; after "respectively" insert a comma --,--;

line 62, delete "base" and insert therefor --basis--.

UNITED STATES PATENT AND TRADEMARK OFFICE
CERTIFICATE OF CORRECTION

PATENT NO. : 4,309,973

DATED : January 12, 1982

INVENTOR(S) : Hideyuki TAMURA

It is certified that error appears in the above—identified patent and that said Letters Patent is hereby corrected as shown below:

Column 3, line 13, delete ", with" and insert therefor a period --.--;

line 14, delete "response to the above shift of the ignition timing."

line 16, change "detailed" to --detail--;

Column 4, line 55, delete "settled to" and insert therefor --set at--;

line 63, delete ", as well as" and insert therefor --. Also,--; delete "amount" and insert therefor --level--;

line 64, delete "per-" and insert therefor --converted--;

line 65, delete "formed with" and insert therefor --in--;

line 68; delete the comma (,) after "memory 13" and insert therefor a period --.--.

Column 5, line 1, delete "so as to be" and insert therefor --This value is--;

line 5, after "limit" delete "thereof"; and after "or is" delete "restrained";

UNITED STATES PATENT AND TRADEMARK OFFICE
CERTIFICATE OF CORRECTION

PATENT NO. : 4,309,973

DATED : January 12, 1982

INVENTOR(S) : Hideyuki TAMURA

It is certified that error appears in the above—identified patent and that said Letters Patent is hereby corrected as shown below:

Column 5, line 6, delete "thereof";

line 49, delete ", so as to raise" and insert therefor --. At this time,--;

line 50, delete "derived from" and insert therefor --is provided by--;

line 60, delete ", and then" and insert therefor --. This count--;

line 68, delete "cutoff" and insert therefor --cuts off--.

Column 6, line 9, delete "upon the low level";

line 12, delete "when the";

line 15, delete "as well as" and insert therefor --. Also,--;

line 27, delete "yet applied thereto" and insert therefor --received--;

line 28, delete "duration on the condition of" and insert therefor --during a--;

line 29, before "high", delete "the"; delete "thereof";

line 30, delete "upon the low level";

UNITED STATES PATENT AND TRADEMARK OFFICE
CERTIFICATE OF CORRECTION

PATENT NO. : 4,309,973

DATED : January 12, 1982

INVENTOR(S) : Hideyuki TAMURA

It is certified that error appears in the above—identified patent and that said Letters Patent is hereby corrected as shown below:

Column 6, line 31, delete "thereof";

line 33, delete "both of respective" and insert therefor --the--;

line 43, delete "in the state of" and insert therefor --during--;

line 61, delete ", which" and insert therefor --. This time duration--;

line 63, delete ", with the" and insert therefore a period --.--;

line 64, delete "employed simple configuration of the ignition device.".

Column 7, line 2, delete "it is not feared at all that";

line 3, delete "precedes" and insert therefor --can precede--;

line 24, delete ", so that the" and insert therefor --. The existence of a--; after "amount of" delete "the";

line 36, delete "previously" and insert therefor --so--;

line 40, delete "in case that" and insert therefor --when--;

UNITED STATES PATENT AND TRADEMARK OFFICE
CERTIFICATE OF CORRECTION

PATENT NO. : 4,309,973  Page 8 of 9
DATED : January 12, 1982
INVENTOR(S) : Hideyuki TAMURA It is certified that error appears in the above—identified patent and that said Letters Patent is hereby corrected as shown below:

Column 7, line 41, after "coil are" insert --set--;

line 42, delete "settled"; delete "such"; delete "can be removed" and insert therefor --such as--;

line 43, delete "that"; delete "becomes" and insert therefor --becoming--;

line 44, delete "with a result of" and insert therefor --resulting in--; delete "caused";

line 45, delete "thereby";

line 47, delete "becomes" and insert therefor --becoming--;

line 48, after "engine" insert --can be prevented--;

line 49, delete "In contract therewith, in case that" and insert therefor --When--;

line 53, delete "is" and insert therefor --are--; delete "it";

line 54, delete "is feared that"; delete "of too short" and insert therefor --occurs in the form of the--;

line 55, delete "is caused" and insert therefor --being too short--;

UNITED STATES PATENT AND TRADEMARK OFFICE
CERTIFICATE OF CORRECTION

PATENT NO. : 4,309,973
DATED : January 12, 1982
INVENTOR(S) : Hideyuki TAMURA

It is certified that error appears in the above—identified patent and that said Letters Patent is hereby corrected as shown below:

Column 7, line 57, delete "of the applica-";

line 58; delete "tion according to the" and insert therefor --with respect to--.

Signed and Sealed this

Thirteenth Day of July 1982

[SEAL]

Attest:

Attesting Officer

GERALD J. MOSSINGHOFF
Commissioner of Patents and Trademarks